United States Patent
Suchy et al.

(10) Patent No.: US 12,006,852 B1
(45) Date of Patent: Jun. 11, 2024

(54) COMBUSTION PROCESS WASTE RECEPTACLE HAVING A FLUID LOCK

(71) Applicant: Radium Engineering LLC, Clackamas, OR (US)

(72) Inventors: Aaron Suchy, Clackamas, OR (US); Jeremy Powell, Happy Valley, OR (US)

(73) Assignee: Radium Engineering LLC, Clackamas, OR (US)

( * ) Notice: Subject to any disclaimer, the term of this patent is extended or adjusted under 35 U.S.C. 154(b) by 98 days.

(21) Appl. No.: 17/834,784

(22) Filed: Jun. 7, 2022

(51) Int. Cl.
*F01M 13/04* (2006.01)
*B01D 46/00* (2022.01)

(52) U.S. Cl.
CPC ......... *F01M 13/04* (2013.01); *B01D 46/0005* (2013.01); *B01D 2271/02* (2013.01); *F01M 2013/0433* (2013.01); *F01M 2013/0438* (2013.01)

(58) Field of Classification Search
CPC ........... F01M 13/04; F01M 2013/0433; F01M 2013/0438; B01D 46/0005; B01D 2271/02
See application file for complete search history.

(56) References Cited

U.S. PATENT DOCUMENTS

| | | |
|---|---|---|
| 4,750,775 A | 6/1988 | Miller |
| 5,527,295 A | 6/1996 | Wing |
| D396,868 S | 8/1998 | Pingel et al. |
| 5,840,104 A * | 11/1998 | Hashimoto ........ B01D 53/0446 96/135 |
| 6,475,255 B1 | 11/2002 | Walker |
| 6,729,316 B1 | 5/2004 | Knowles |
| 7,306,076 B1 | 12/2007 | Krick |
| 8,152,887 B2 | 4/2012 | Patel |
| 8,291,929 B2 | 10/2012 | Greene et al. |
| 8,448,676 B2 | 5/2013 | Hughes |
| 8,616,188 B2 | 12/2013 | Heckel et al. |
| 8,968,446 B1 | 3/2015 | Mainiero |
| 10,434,450 B2 | 10/2019 | Otsuka et al. |
| D870,785 S | 12/2019 | Wu |

(Continued)

FOREIGN PATENT DOCUMENTS

| | | | | |
|---|---|---|---|---|
| CN | 205663477 U | 10/2016 | | |
| DE | 202011002775 | * | 4/2012 | ............. F01M 13/04 |

OTHER PUBLICATIONS

Amazon; "Evil Energy Baffled Oil Catch Can Reservoir Tank with 3/8" NBR Fuel Line Aluminum Black 300ml; product description; Nov. 17, 2019; 10 pages; manufactured by Speedwow Tuning; brand Evil Energy; available at: https://www.amazon.com/EVIL-ENERGY-Universal-Reservoir-Aluminum/dp/B081N392BN?th=1.

(Continued)

*Primary Examiner* — Syed O Hasan
(74) *Attorney, Agent, or Firm* — Law Office of Karen Dana Oster, LLC

(57) ABSTRACT

Described herein is a combustion process waste receptacle having a fluid lock that has an open state (in which fluid contaminants can pass into a fluid contaminant reservoir) and a closed state (in which fluid contaminants are prevented from entering into a fluid contaminant reservoir). The fluid lock preferably transitions from the open state to the closed state when the fluid contaminant reservoir is full. The fluid lock preferably includes a float chamber and a floatable float.

28 Claims, 16 Drawing Sheets

(56) References Cited

U.S. PATENT DOCUMENTS

| | | | |
|---|---|---|---|
| D870,786 S | 12/2019 | Wu | |
| D884,760 S | 5/2020 | Tafe et al. | |
| D884,761 S | 5/2020 | Tafe et al. | |
| D910,727 S | 2/2021 | Tafe et al. | |
| 2004/0217042 A1* | 11/2004 | Dworatzek | B01D 35/30 210/130 |
| 2006/0032486 A1* | 2/2006 | Prasad | F01M 13/04 55/DIG. 19 |
| 2013/0118460 A1 | 5/2013 | Lockard | |
| 2018/0128135 A1 | 5/2018 | Wiley | |
| 2019/0210039 A1 | 7/2019 | Kuhn | |
| 2021/0095586 A1 | 4/2021 | Phillips et al. | |

OTHER PUBLICATIONS

Amazon; "Universal Car Oil Catch Can Kit Polish Baffled Automotive Reservoir Tank 300ml with Breather Aluminum Compact Dual Cylinder"; product description; Nov. 15, 2018; 10 pages; manufactured by EIGIIS; available at: https://www.amazon.com/Universal-Reservoir-Breather-Aluminum-Separator/dp/B07KK7CRDH?th=1.

APR; "APR Catch Can—Part #MS100100—1.8T / 2.0T EA888 GEN 3 MQB"; product description; at least as early as Feb. 21, 2022; 5 pages; APR website; available at: https://www.goapr.com/products/engine_hardware/catch_cans/apr_full_catch_can_-_mqb_18t_and_20t/parts/MS100199.

CN205663477U; Espace Machine Translation of CN205663477U; translation generated on May 6, 2022; 4 pages.

JEGS; "Air Oil & Water Separator [4 1/2 in. Height × 1 3/4 in. Diameter];" product description; JEGS website; accessed at least as early as May 26, 2022; 6 pages; jegs.com/i/JEGS/555/52205/10002/-1.

Mishimoto; "Black Oil Catch Can"; product description; at least as early as Apr. 13, 2022; 4 pages; Mishimoto website; available at: http://www.mishimoto.com/mishimoto-all-black-oil-catch-can.html.

Mishimoto; "Mishimoto Compact Baffled Oil Catch Can, 2-Port"; product description; at least as early as Apr. 13, 2022; 7 pages; Mishimoto website; http://www.mishimoto.com/compact-baffled-oil-catch-can-2-port-bc.html.

Nuke Performance; "Universal Oil Catch Cans"; product description; at least as early as Feb. 21, 2022; 6 pages; Nuke Performance website; https://www.nukeperformance.com/category/html/oil-catch-cans.

Radium Auto; "Catch Cans 101"; blog post entry; Feb. 10, 2015; 10 pages; Radium Engineering website; available at: http://www.radiumauto.com/Blog/Archive/2015/2/.

Radium Auto; "Universal Catch Cans & AOS"; list of products; at least as early as Apr. 22, 2022; 3 pages; Radium Engineer website: available at: http://www.radiumauto.com/Universal-Catch-Cans-AOS-C58.aspx.

Radium Auto; "Universal Single Catch Can"; product description; at least as early as Apr. 22, 2022; 2 pages; Radium Engineering website; available at: http://www.radiumauto.com/Universal-Single-Catch-Can-P178.aspx.

UPR Products; "UPR Billet Catch Can Diffuser"; product description; at least as early as Feb. 21, 2022; 5 pages; UPR Products website; available at: https://www.uprproducts.com/upr-billet-oil-catch-can-diffuser/.

* cited by examiner

COMBUSTION PROCESS WASTE RECEPTACLE HAVING A FLUID LOCK

TECHNICAL FIELD

The present disclosure describes apparatuses and/or systems that generally relate to the technical field of combustion process waste receptacles (including catch cans, oil collectors, and air/oil separators) for use in a vehicle, and specifically relate to the technical field of combustion process waste receptacles having a fluid lock for use in a vehicle.

BACKGROUND

Internal combustion engines operate through a series of explosions (the ignition of air and fuel that creates energy in the form of expanding gas) in a combustion chamber of a cylinder. A piston (the perimeter of which is surrounded by piston rings that act as a seal between the outer perimeter of the piston rings and the inner perimeter of the cylinder) is slideably positioned within the cylinder. The bottom of the piston is indirectly connected (via, for example, a connecting rod) to the crankshaft that is in a crankcase (engine crankcase). The explosions create a cycle of "strokes" of the piston: the intake stroke; the compression stroke; the combustion stroke; and the exhaust stroke. Sometimes some of the gas (a mixture of air and unburned fuel created by the explosions of the combustion stroke) gets past the piston rings, escapes from the combustion chamber, and flows into the crankcase. (Other fluid contaminants (e.g. vapor from the oil in a container/pan at the bottom of the crankcase) can also co-mingle with the blow-by gases.) This escape may be referred to generally as "blow-by" and the escaped product may be referred to as "contaminated air" (which may include, for example, unburned fuel, water moisture, acids, and oil). The phrase, contaminated air, is meant to include "blow-by gases" (which is the product created specifically by blow-by) and/or other fluid contaminants.

Blow-by is unavoidable. Blow-by is also undesirable for reasons including, but not limited to, the following reasons: it can dilute and/or contaminate the engine oil; it can cause corrosion of critical engine parts; it can contribute to a buildup of sludge; it can make the gas-air mixture recirculated to the cylinders so combustible that it causes problems (e.g. backfiring and clogging); it can reduce heat exchanger efficiency on forced induction vehicles; it can reduce the effective octane of the fuel resulting in poor engine performance; and/or it can increase pressure within the crankcase (which can lead to oil leakage and reduced engine performance).

Early engines allowed blow-by gases to escape directly into the atmosphere. Most engines currently use a positive crankcase ventilation (PCV) system to recycle blow-by gases so that they are not exhausted to the atmosphere. As shown in FIG. 1, this recycling may be accomplished by venting the blow-by gases (shown as a combination of white/empty circles and black/filled circles) from the engine crankcase 110 (through a PCV valve 112), and through a contaminated air conduit 120 (also referred to as a PCV line), to an air induction system 140 (that may include, for example, an air intake manifold, an air filter, and an intake pipe). From the air induction system 140 the blow-by gases would be pumped back into the cylinders to begin the cycle again. Put another way, the PCV valve extracts blow-by gas from the crankcase, feeds it back to the engine to be burnt, and exhausts it through the exhaust pipe.

Catch cans, oil collectors, and air/oil separators (and other products having similar names) are known products that can be used to remove fluid contaminants from the contaminated air to create at least partially clean air. Some of these products recirculate the at least partially clean air into the air induction system. The following patents and patent publications describe exemplary known products, and are incorporated herein by reference:

U.S. Pat. No. 6,475,255 to Walker, entitled "Serviceable Air Filter/Oil Separator Assembly";
U.S. Pat. No. 6,729,316 to Knowles, entitled "Method and Apparatus for Treating Crankcase Emission";
U.S. Pat. No. 8,152,887 to Patel, entitled "Air/Oil Separator";
U.S. Pat. No. 8,448,676 to Hughes, entitled "Multiple Sump Fuel Sampler with Catch Can";
U.S. Pat. No. 8,616,188 to Heckel et al., entitled "Engine Air Management System";
U.S. Pat. No. 8,968,446 to Mainiero, entitled "Oil and Air Separation System and Method";
U.S. Pat. No. 10,434,450 to Otsuka et al., entitled "Oil Catch Apparatus";
U.S. Patent Publication No. 2018/0128135 to Wiley, entitled "PCV Adapter for Catch Can";
U.S. Patent Publication No. 2019/0210039 to Kuhn, entitled "Crankcase Ventilation Management Devices, Systems, and Methods"; and
U.S. Patent Publication No. 2021/0095586 to Phillips et al., entitled "Porous Polymer Matrix Catch Can."

SUMMARY

The present disclosure describes combustion process waste receptacles (e.g. catch cans, oil collectors, and air/oil separators) having a fluid lock for use in a vehicle. The combustion process waste receptacle (also referred to as "waste receptacle") preferably has a main passageway, a fluid contaminant passageway, a filter, and a fluid contaminant reservoir. The main passageway preferably has an inlet port and an outlet port. The filter is preferably associated with the main passageway. The fluid contaminant passageway preferably provides a fluid connection between the filter and the fluid contaminant reservoir.

A first preferred waste receptacle preferably includes a fluid lock associated with the fluid contaminant passageway. The fluid lock preferably has an open state and a closed state. In the open state, the fluid lock allows passage through the fluid contaminant passageway. In the closed state, the fluid lock prevents passage through fluid contaminant passageway. When the waste receptacle receives contaminated air at the inlet port, if the fluid lock is in the open state, fluid contaminants pass through the fluid lock and into the fluid contaminant reservoir, and if the fluid lock is in the closed state, fluid contaminants are prevented from passing through the fluid lock and into the fluid contaminant reservoir.

The fluid lock preferably transitions from the open state to the closed state when the fluid contaminant reservoir is full. The filter may be positioned within the main passageway between the inlet port and the outlet port. The fluid contaminant passageway may be positioned below the filter. The fluid lock may be positioned below the filter. The fluid contaminant passageway may be branched off the main passageway. The fluid lock being a one-way valve.

The first preferred waste receptacle may include a float chamber with a chamber sealing surface, the float chamber associated with the fluid contaminant passageway. The fluid lock also preferably includes a float with a float sealing surface, the float at least partially positioned within the float chamber. The fluid lock is in the open state when a gap is defined between the float sealing surface and the chamber sealing surface. The fluid lock is in the closed state when the float sealing surface is in sealing contact with the chamber sealing surface.

The first preferred waste receptacle may include a float chamber with a chamber sealing surface, the float chamber associated with the fluid contaminant passageway. The fluid lock also preferably includes a floatable float with a float sealing surface, the float at least partially positioned within the float chamber and held therein by a flow-through retainer. The fluid lock is in the open state when the floatable float rests on the flow-through retainer and a gap is defined between the float sealing surface and the chamber sealing surface. The fluid lock is in the closed state when the floatable float rises to bring the float sealing surface is in sealing contact with the chamber sealing surface.

A second preferred waste receptacle preferably includes a fluid lock associated with the fluid contaminant passageway. The fluid lock preferably has an open state and a closed state. In the open state, the fluid lock allows passage through the fluid contaminant passageway. In the closed state, the fluid lock prevents passage through fluid contaminant passageway. When the waste receptacle receives contaminated air at the inlet port, if the fluid lock is in the open state, fluid contaminants pass through the fluid lock and into the fluid contaminant reservoir, and if the fluid lock is in the closed state, fluid contaminants are prevented from passing through the fluid lock and into the fluid contaminant reservoir. The fluid lock transitions from the open state to the closed state when the fluid contaminant reservoir is full.

The filter may be positioned within the main passageway between the inlet port and the outlet port. The fluid contaminant passageway may be positioned below the filter. The fluid lock may be positioned below the filter. The fluid contaminant passageway may be branched off the main passageway. The fluid lock being a one-way valve.

The second preferred waste receptacle may include a float chamber with a chamber sealing surface, the float chamber associated with the fluid contaminant passageway. The fluid lock also preferably includes a float with a float sealing surface, the float at least partially positioned within the float chamber. The fluid lock is in the open state when a gap is defined between the float sealing surface and the chamber sealing surface. The fluid lock is in the closed state when the float sealing surface is in sealing contact with the chamber sealing surface.

The second preferred waste receptacle may include a float chamber with a chamber sealing surface, the float chamber associated with the fluid contaminant passageway. The fluid lock also preferably includes a floatable float with a float sealing surface, the float at least partially positioned within the float chamber and held therein by a flow-through retainer. The fluid lock is in the open state when the floatable float rests on the flow-through retainer and a gap is defined between the float sealing surface and the chamber sealing surface. The fluid lock is in the closed state when the floatable float rises to bring the float sealing surface is in sealing contact with the chamber sealing surface.

A third preferred waste receptacle preferably includes a fluid lock associated with the fluid contaminant passageway. The fluid lock preferably has an open state and a closed state. The fluid lock preferably includes a float chamber and a floatable float. The float chamber preferably has a chamber sealing surface, the float chamber associated with the fluid contaminant passageway. The floatable float preferably has a float sealing surface. The float is at least partially positioned within the float chamber. The floatable float is retained within the float chamber by the flow-through retainer. The fluid lock is in the open state (allowing passage through the fluid contaminant passageway) when the floatable float rests on the flow-through retainer and a gap is defined between the float sealing surface and the chamber sealing surface. The fluid lock is in the closed state (preventing passage through fluid contaminant passageway) when the floatable float rises to bring the float sealing surface is in sealing contact with the chamber sealing surface. When the waste receptacle receives contaminated air at the inlet port, if the fluid lock is in the open state, fluid contaminants pass through the fluid lock and into the fluid contaminant reservoir, and if the fluid lock is in the closed state, fluid contaminants are prevented from passing through the fluid lock and into the fluid contaminant reservoir.

Objectives, features, combinations, and advantages described and implied herein will be more readily understood upon consideration of the following detailed description of the invention, taken in conjunction with the accompanying drawings. The subject matter described herein is also particularly pointed out and distinctly claimed in the concluding portion of this specification.

DESCRIPTION OF THE DRAWINGS

The accompanying drawings illustrate various exemplary waste receptacles having a fluid lock, components of various exemplary waste receptacles having a fluid lock, and/or provide teachings by which the various exemplary waste receptacles having a fluid lock are more readily understood.

Figure 1:
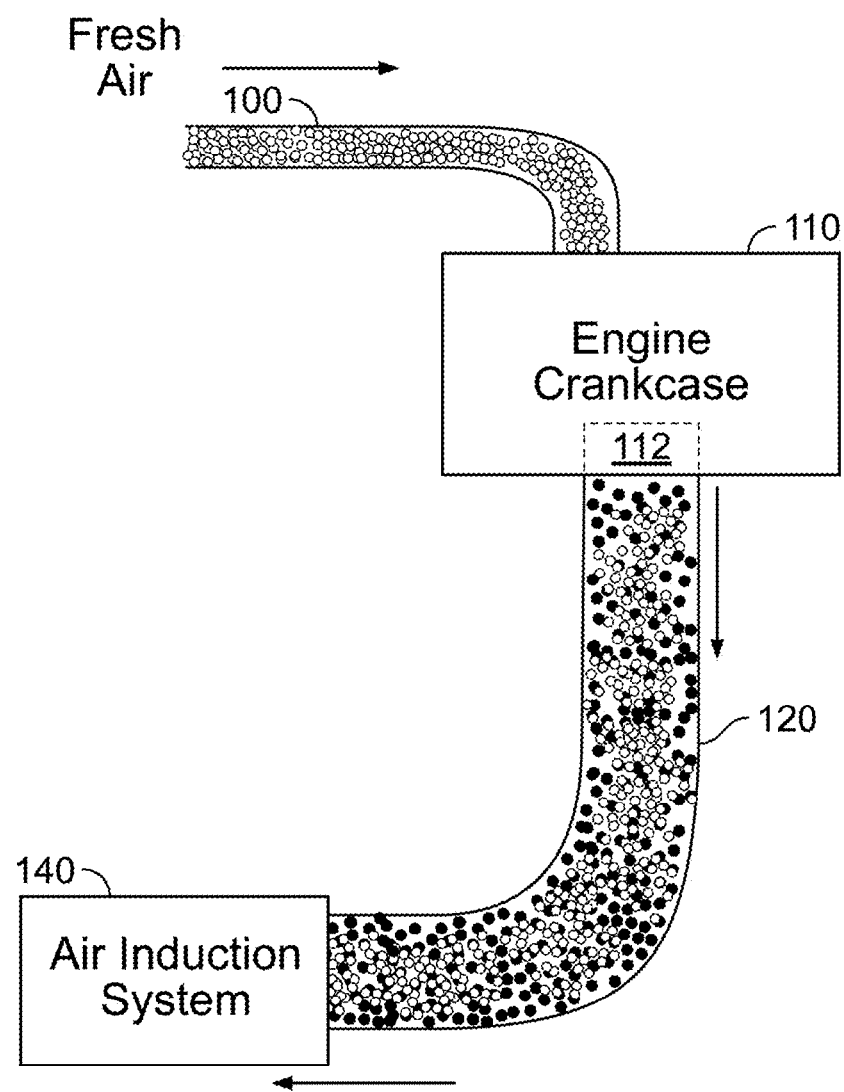
FIG. 1 is a schematic diagram of a prior art partial simplified engine including a fresh air conduit, an engine crankcase, a contaminated air conduit, and an air induction system.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION

Described herein are combustion process waste receptacles 200, 300 (also referred to as waste receptacles 200, 300) having a fluid lock 240, 340 for use in a vehicle. The fluid lock 240 has an open state in which the waste receptacle 200 is able to remove fluid contaminants (shown as black/filled circles) from the contaminated air (shown as a combination of white/empty circles and black/filled circles) to create at least partially clean air (shown as mostly white/empty circles and a few black/filled circles). The fluid lock 240 has a closed state in which the contaminated air (shown as a combination of white/empty circles and black/filled circles) is prevented from entering the waste receptacle 200. Preferably, the fluid lock 240 is in the closed state when the waste receptacle 200 is full.

FIG. 1 shows a known partial simplified engine including a fresh air conduit 100 (also referred to as a crankcase vent line), an engine crankcase 110 (that has a PCV valve 112), a contaminated air conduit 120 (also referred to as a PCV line), and an air induction system 140 (that includes, for example, an air intake manifold, an air filter, and an intake pipe). Known catch cans, oil collectors, and air/oil separators, including those discussed in the Background, have been inserted between an engine crankcase 110 and an air induction system 140.

The known catch cans, oil collectors, and air/oil separators have problems such as fluid contaminants (collected fluid contaminants) sloshing out (e.g. if the waste receptacle is not vertical or if there is a sudden stop), splashing out (e.g. if something drops into the waste receptacle or if there is a sudden stop), overflowing (e.g. if the waste receptacle is full) from, or otherwise escaping during use. In addition, if the known catch cans, oil collectors, and air/oil separators are full (or almost full), during servicing the fluid contaminants can easily spill. Put another way, if the catch can is full, fluid contaminants (collected fluid contaminants) can overflow into the PCV hose (contaminated air conduit 120) and be sucked into the engine and burned in high concentrations. This results in problems including, but not limited to, smoke out of the tailpipe, poor engine performance, emissions systems errors, and loss of engine power. Preferred waste receptacles 200, 300 having a fluid lock 240, 340 described herein solve some or all of these problems.

Figure 2:
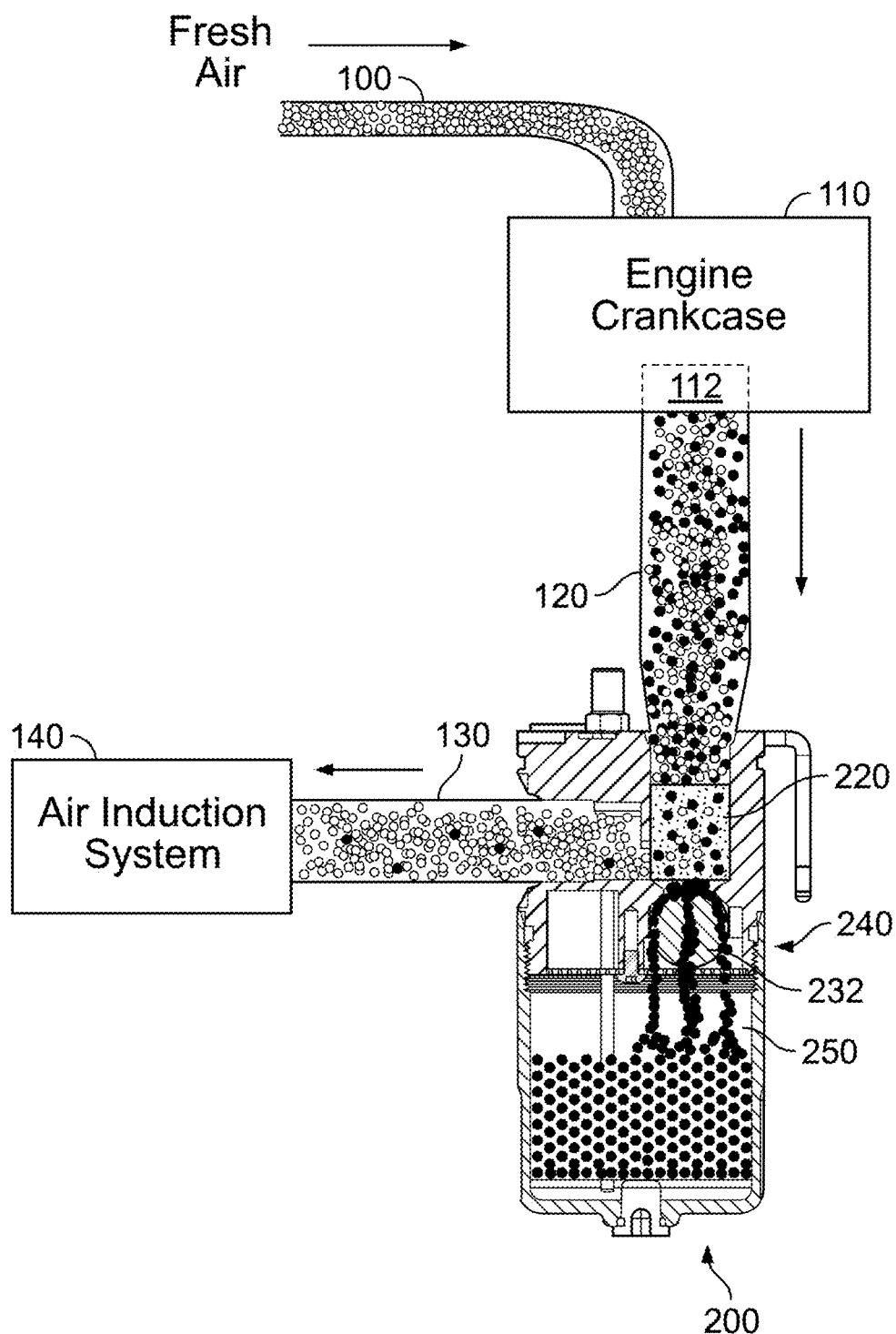
FIG. 2 is a schematic diagram of an exemplary waste receptacle having a fluid lock inserted inline between an engine crankcase and an air induction system, the fluid lock being in an open state.
Figure 3:
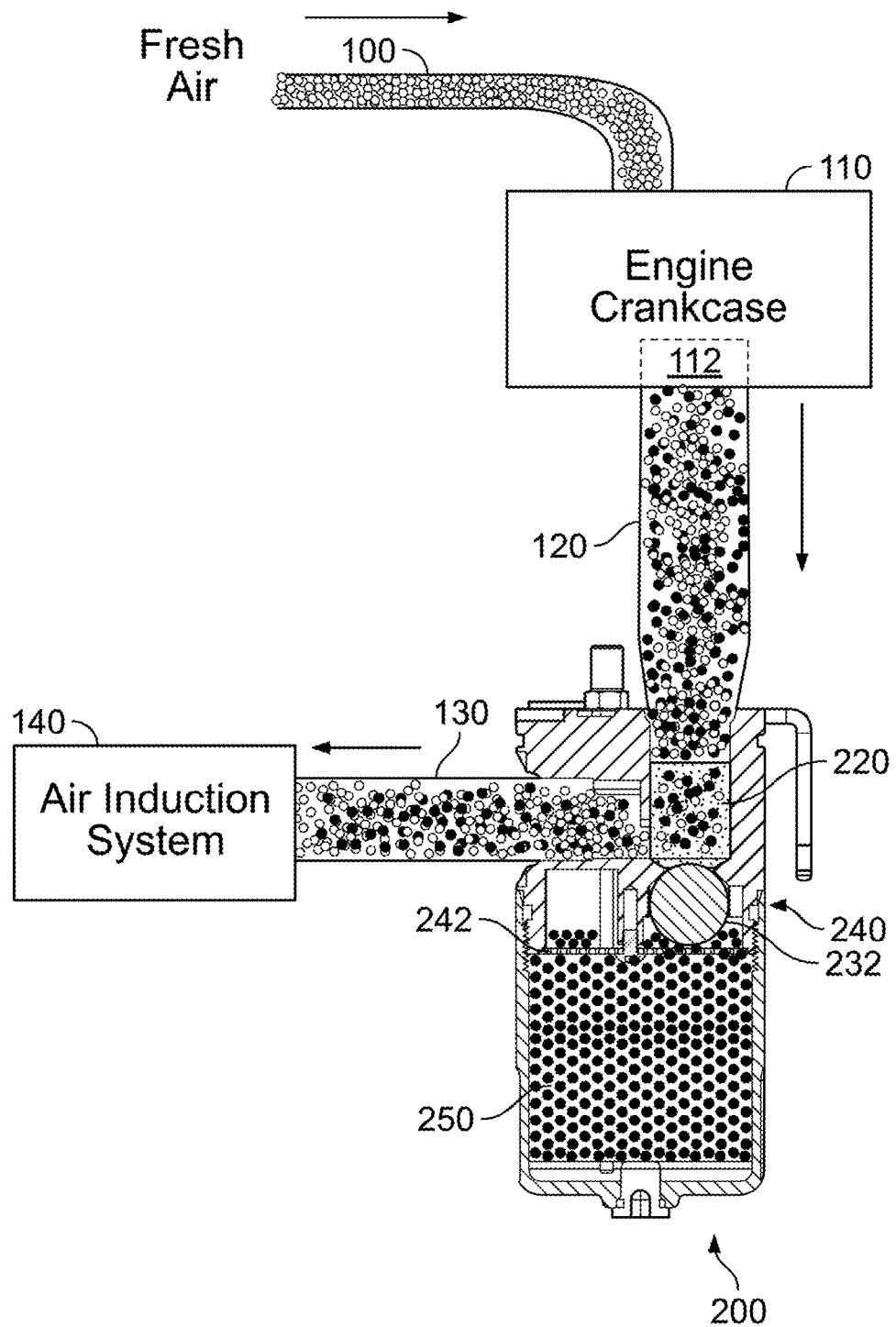
FIG. 3 is a schematic diagram of the exemplary waste receptacle of FIG. 2, the fluid lock being in a closed state.
Figure 4:
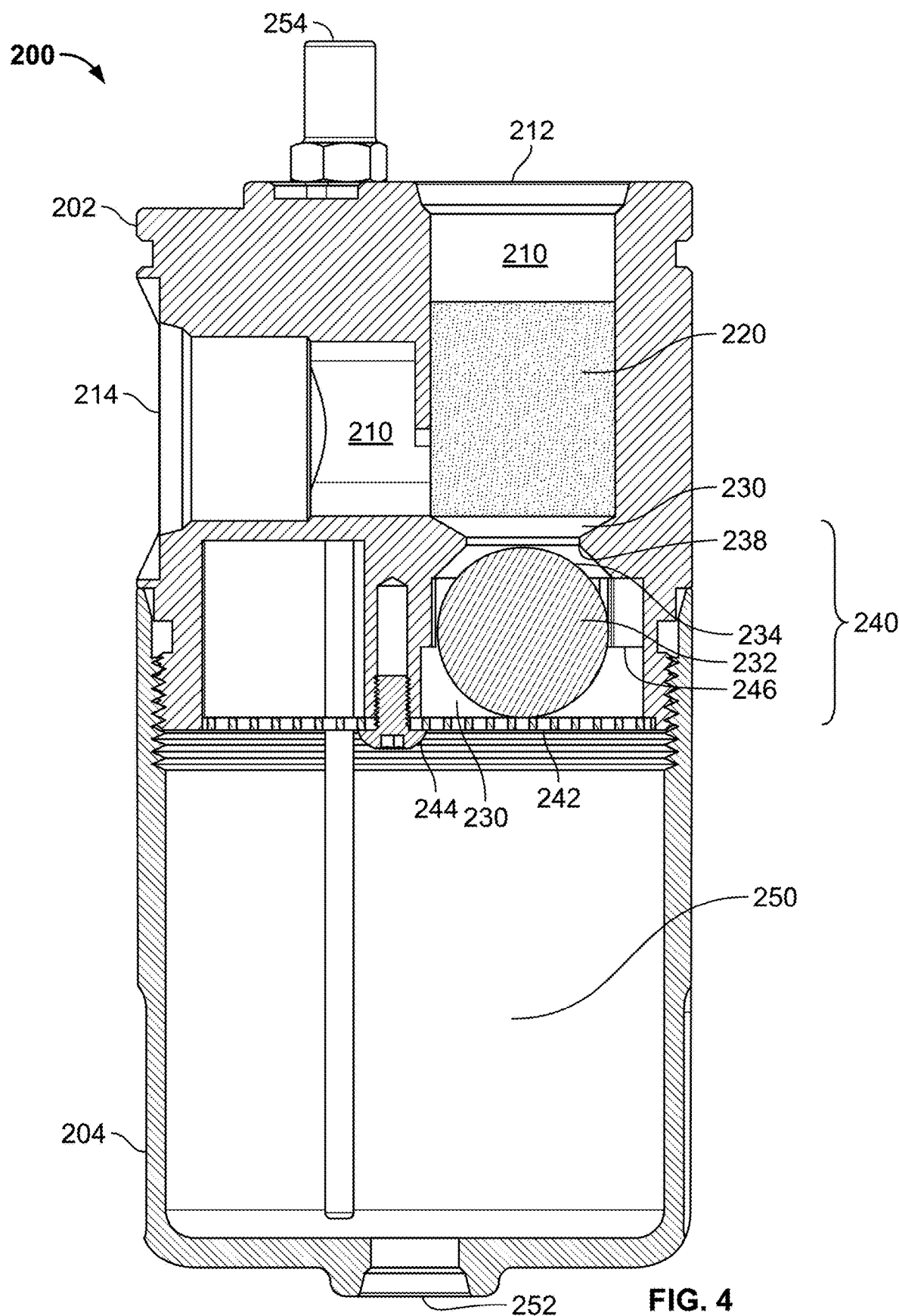
FIG. 4 is a cross-sectional side view of an exemplary waste receptacle having a fluid lock, the fluid lock being in an open state.
Figure 5:
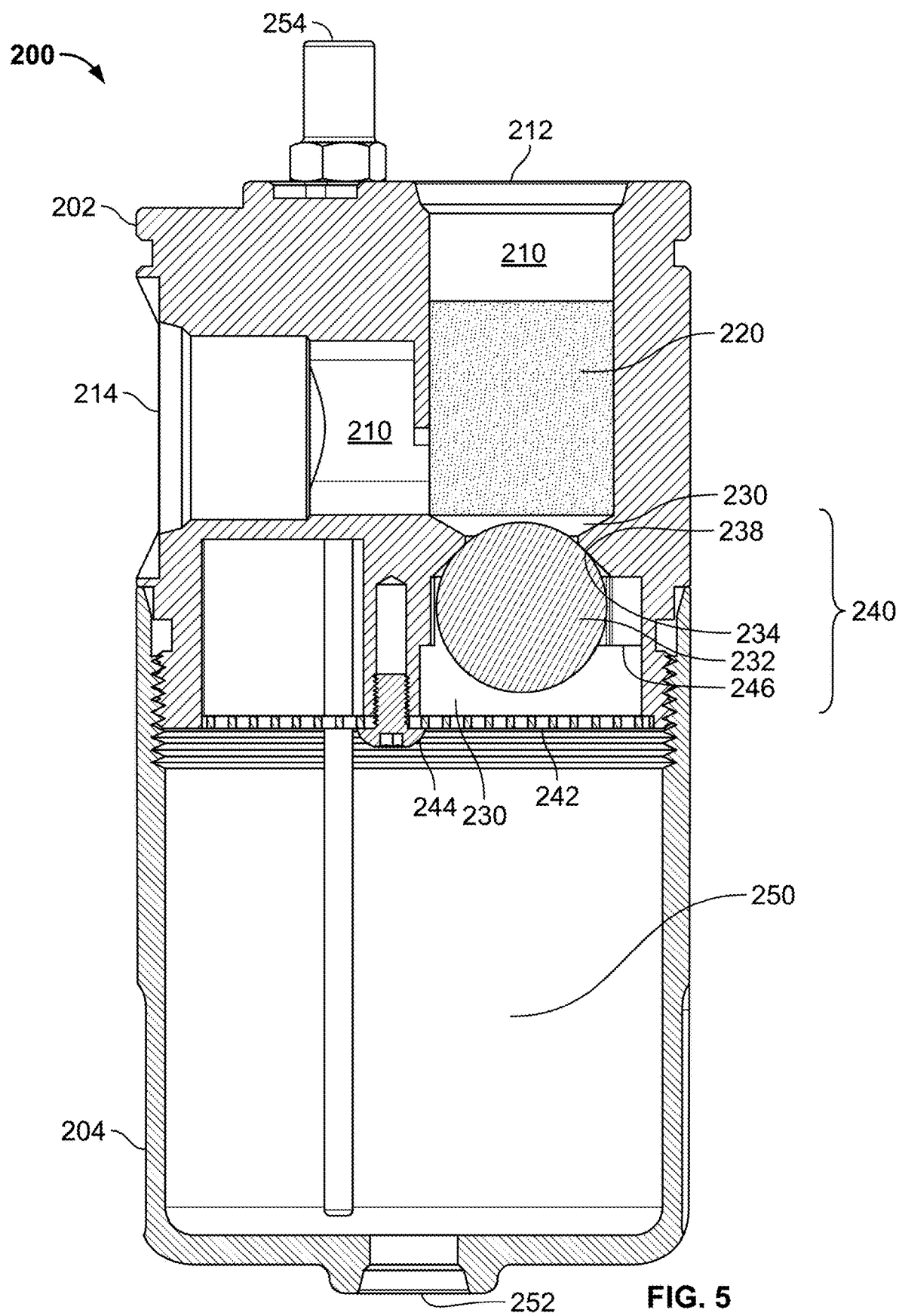
FIG. 5 is a cross-sectional side view of the exemplary waste receptacle of FIG. 4, the fluid lock being in a closed state.
Figure 6:
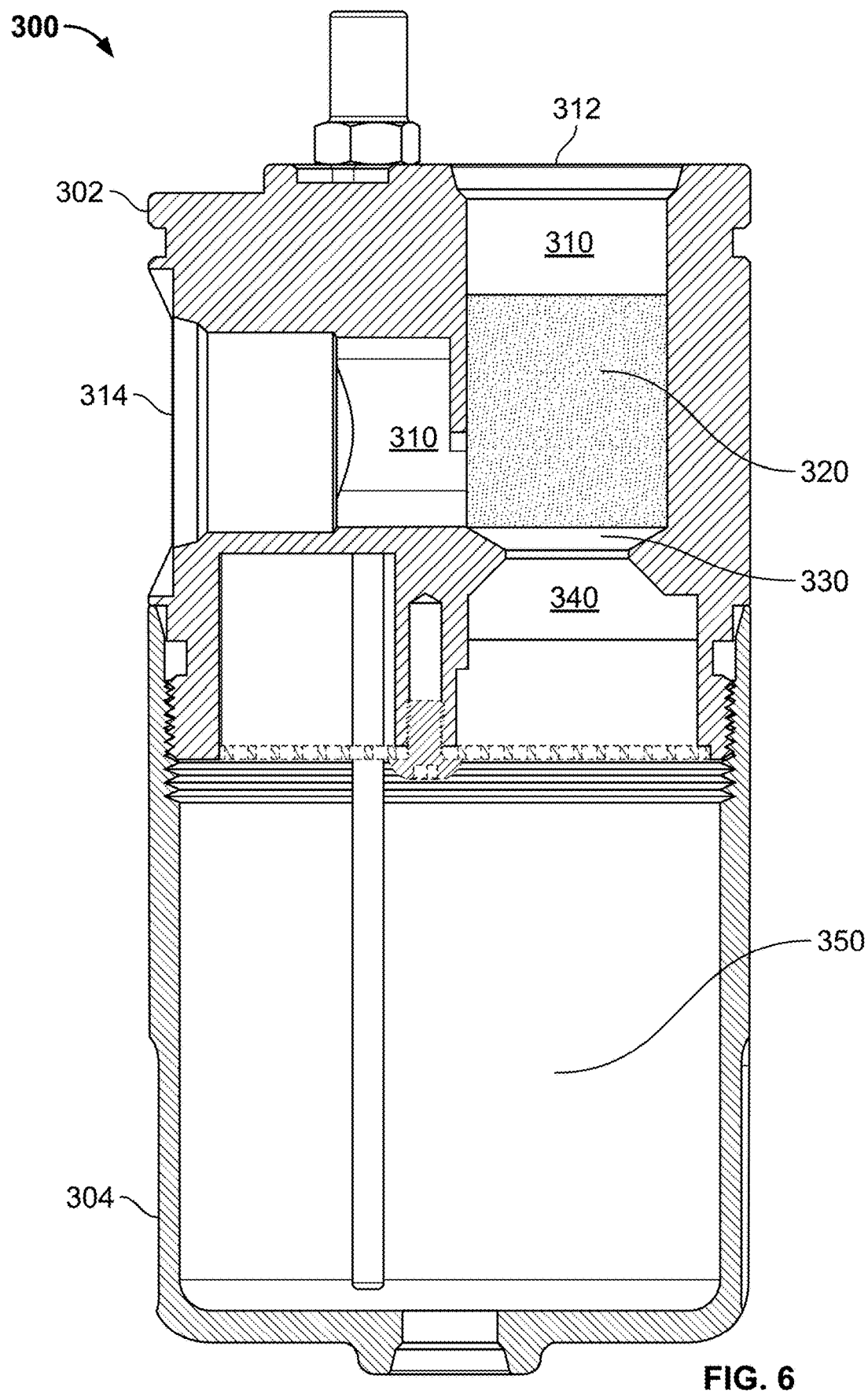
FIG. 6 is a cross-sectional side view of an alternative exemplary waste receptacle having an alternative fluid lock.

As will be discussed, FIGS. 2 and 3 show an exemplary waste receptacle 200 having a fluid lock 240 that has been inserted inline between the engine crankcase 110 and the air induction system 140 such that the exemplary waste receptacle 200 divides the conduit into a contaminated air conduit 120 and a filtered air conduit 130. FIGS. 2 and 4 show the waste receptacle 200 with the fluid lock 240 in an exemplary open state. When the fluid lock 240 in this open state, the waste receptacle 200 is able to remove fluid contaminants (shown as black/filled circles) from the contaminated air (shown as a combination of white/empty circles and black/filled circles) to create at least partially clean air (shown as mostly white/empty circles and a few black/filled circles). FIGS. 3 and 5 show the waste receptacle 200 with the fluid lock 240 in an exemplary closed state. When the fluid lock 240 is in this closed state, the contaminated air (shown as a combination of white/empty circles and black/filled circles) is prevented from entering the waste receptacle 200. FIG. 6 shows an alternative waste receptacle 300 with an alternative fluid lock 340.

Figure 7:
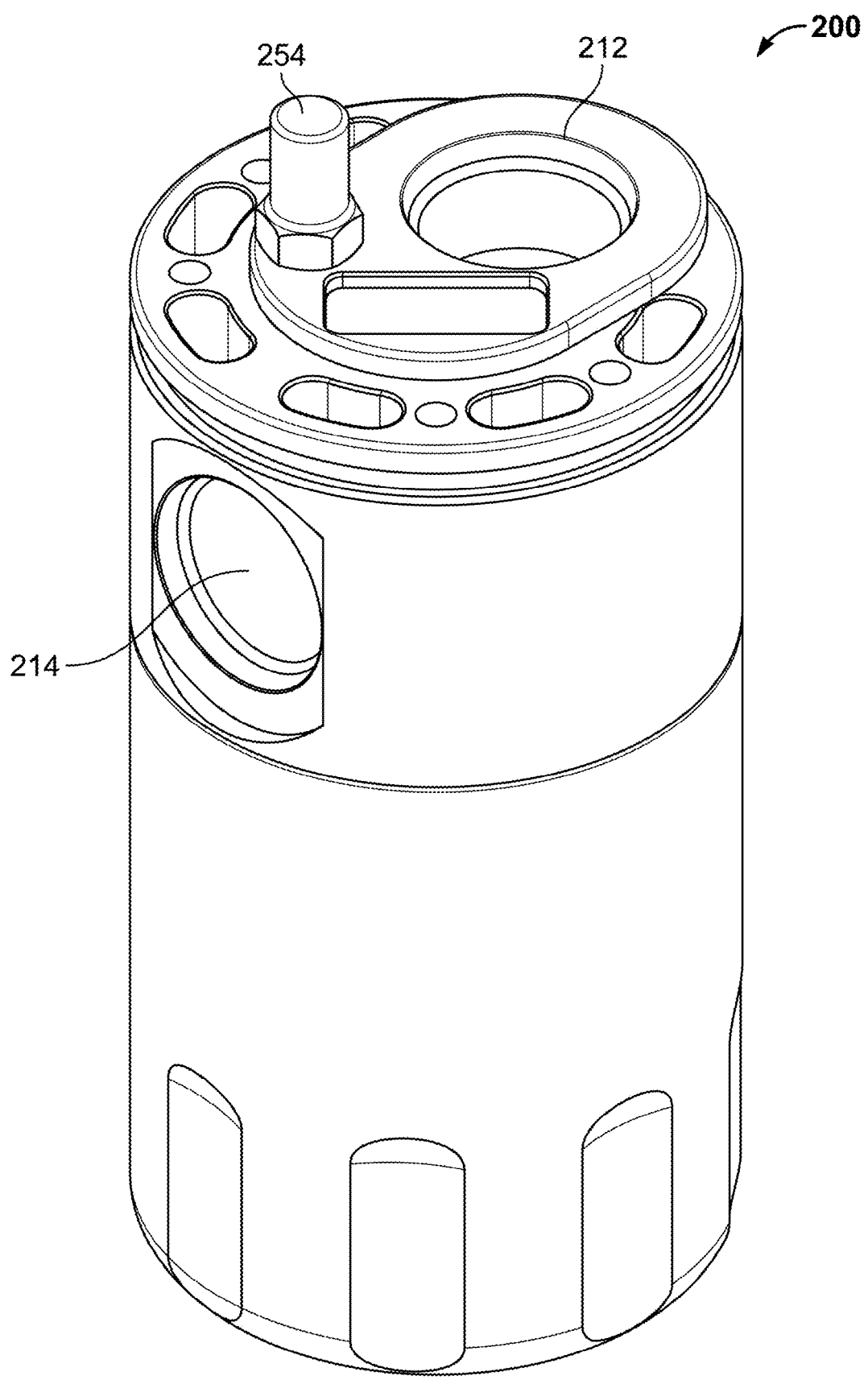
FIG. 7 is a first isometric view of the exterior of an exemplary waste receptacle.
Figure 8:
FIG. 8 is a second isometric view of the exterior of the exemplary waste receptacle of FIG. 7.
Figure 9:
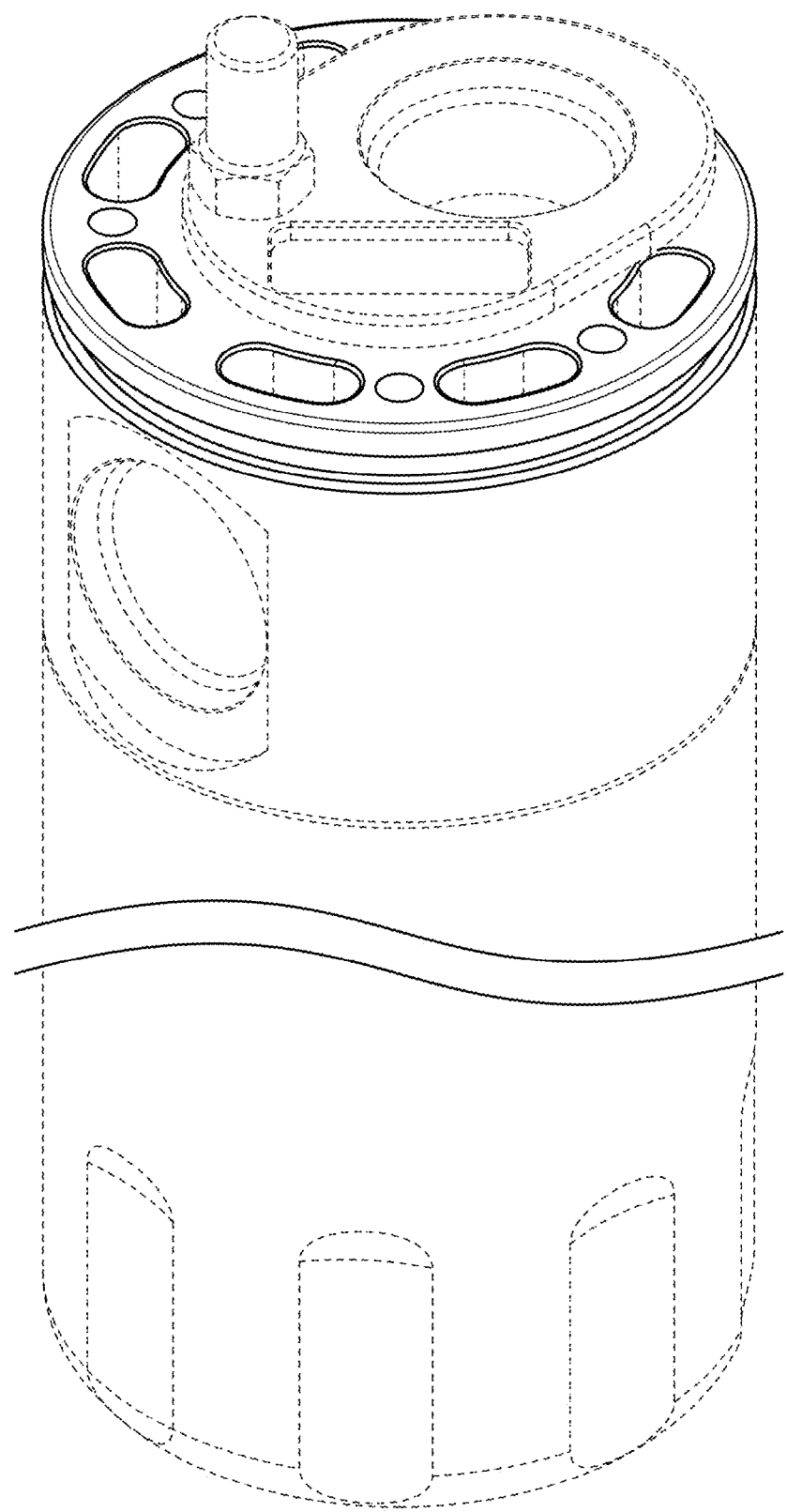
FIG. 9 is a first isometric view of the exterior of an exemplary waste receptacle of indeterminate height with some portions shown in dashed lines.
Figure 10:
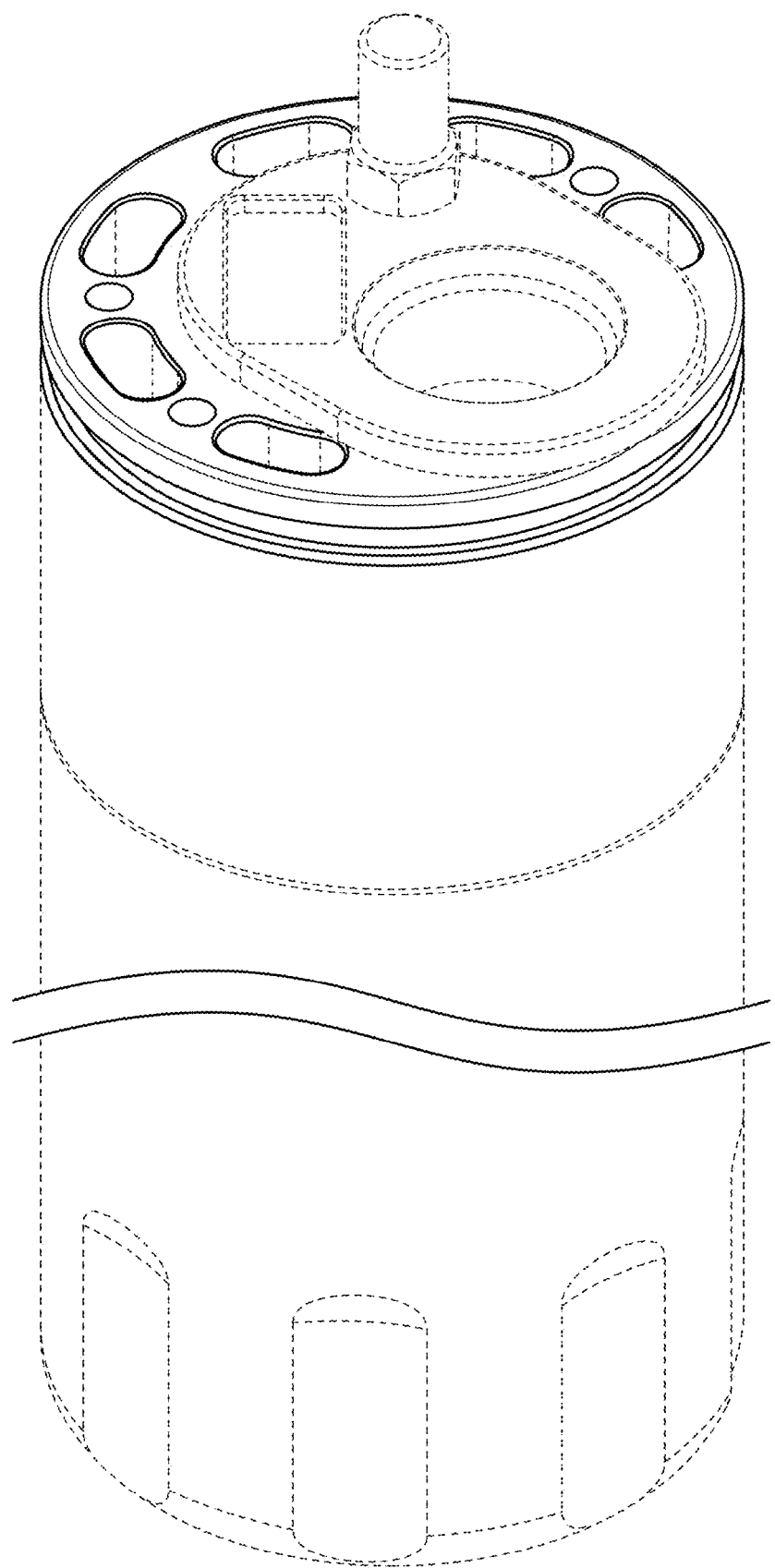
FIG. 10 is a second isometric view of the exterior of the exemplary waste receptacle of FIG. 8.
Figure 11:
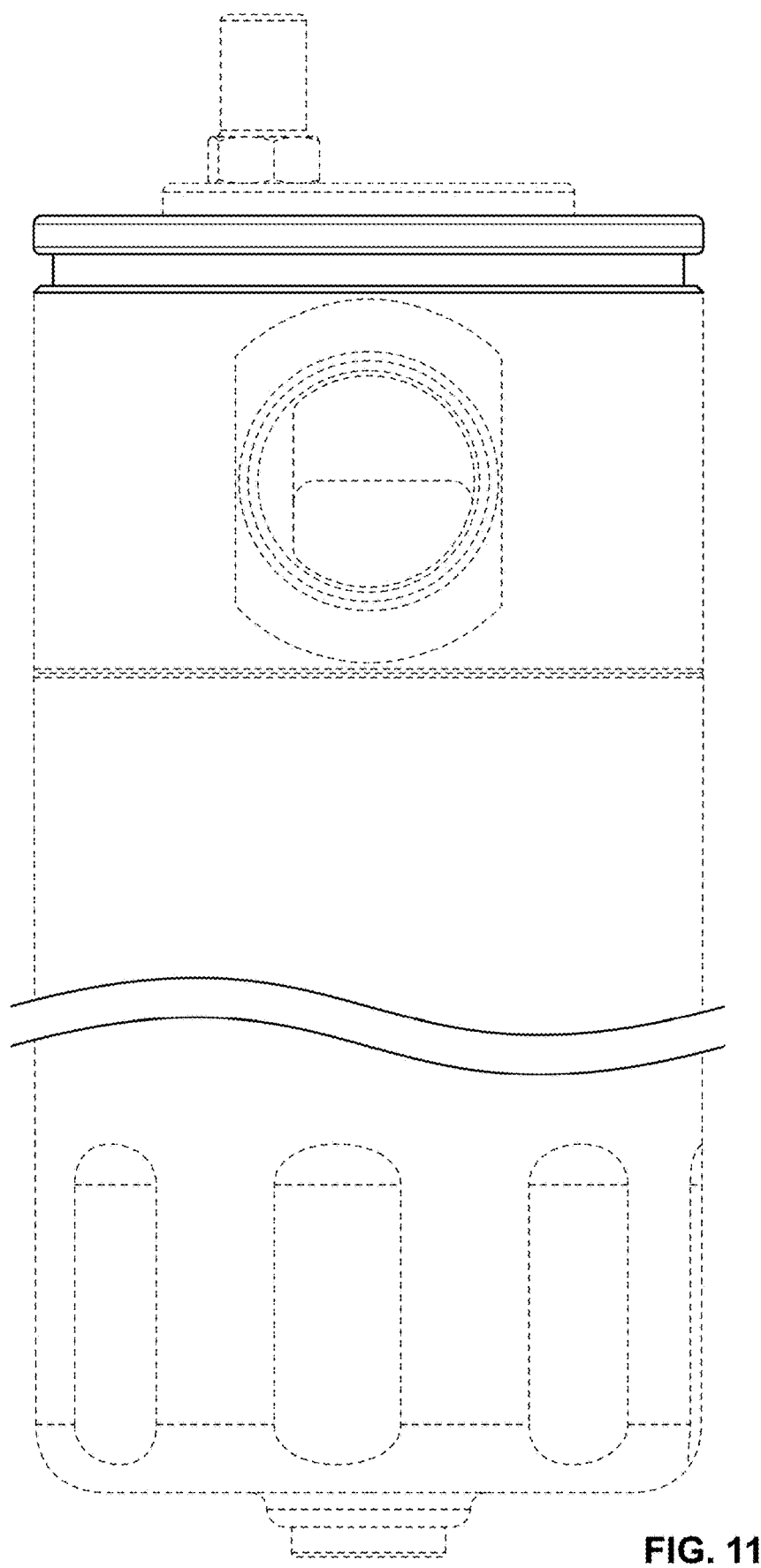
FIG. 11 is a front view of the exterior of the exemplary waste receptacle of FIG. 8.
Figure 12:
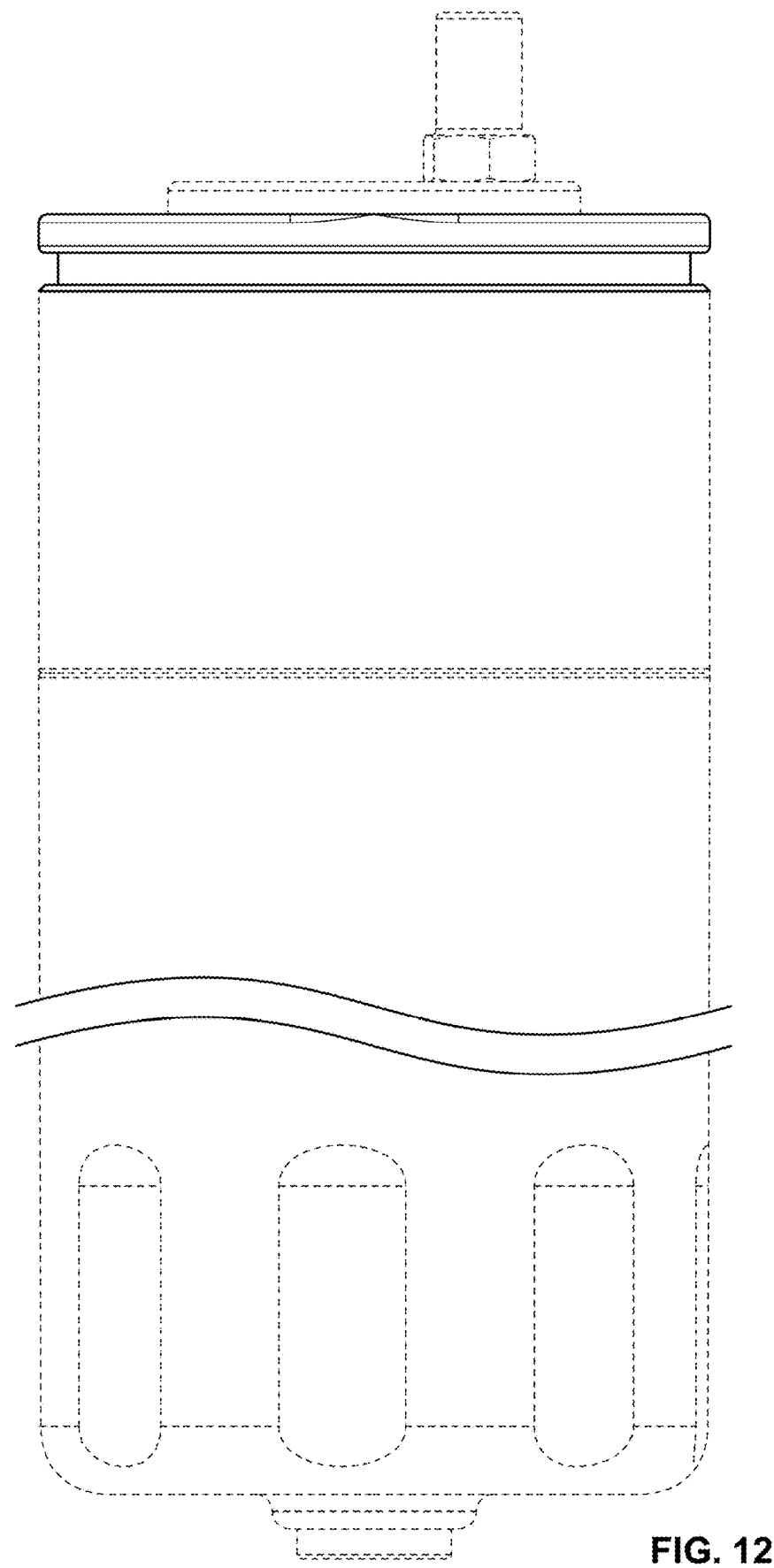
FIG. 12 is a back view of the exterior of the exemplary waste receptacle of FIG. 8.
Figure 13:
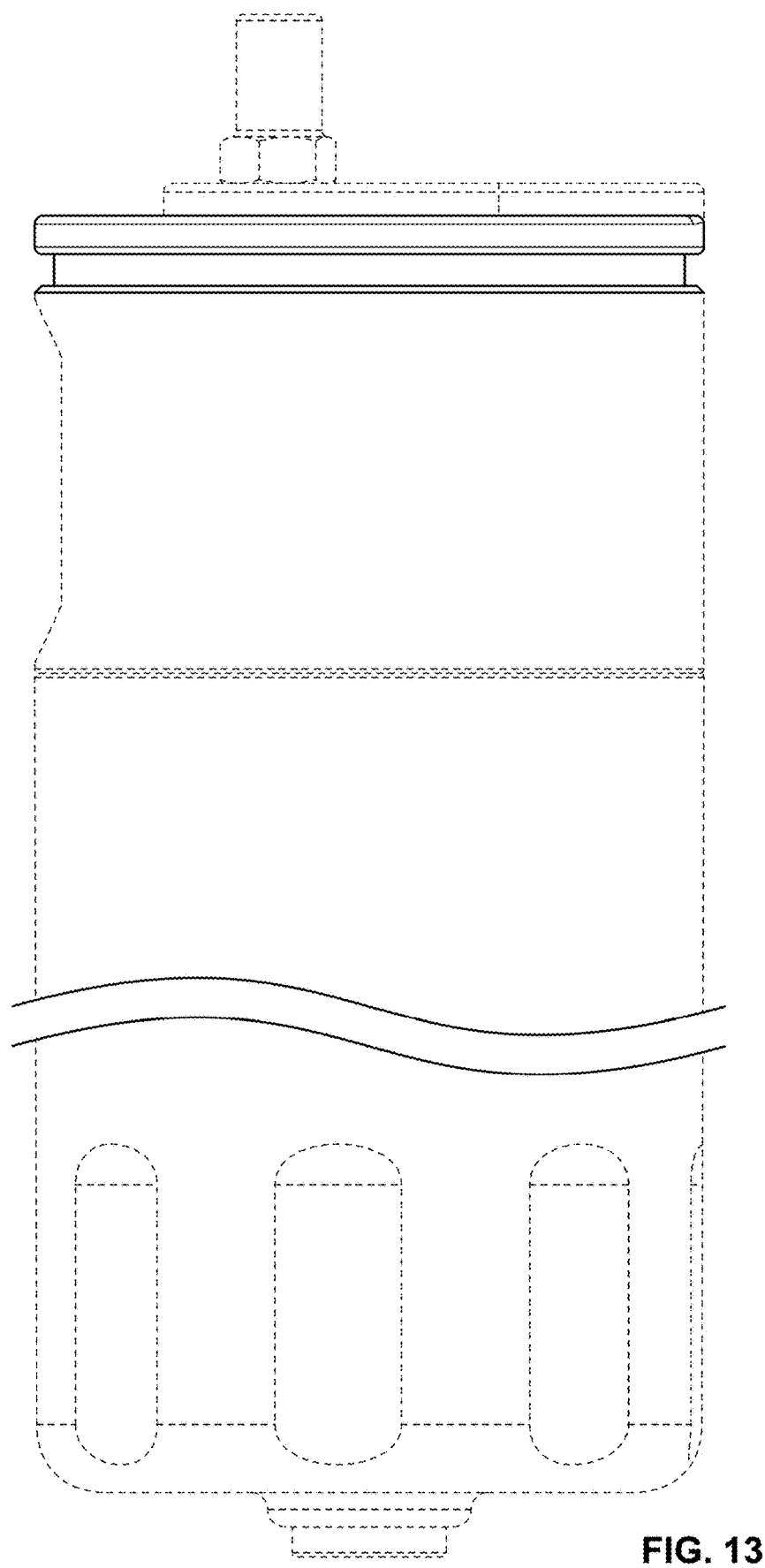
FIG. 13 is a first side view of the exterior of the exemplary waste receptacle of FIG. 8.
Figure 14:
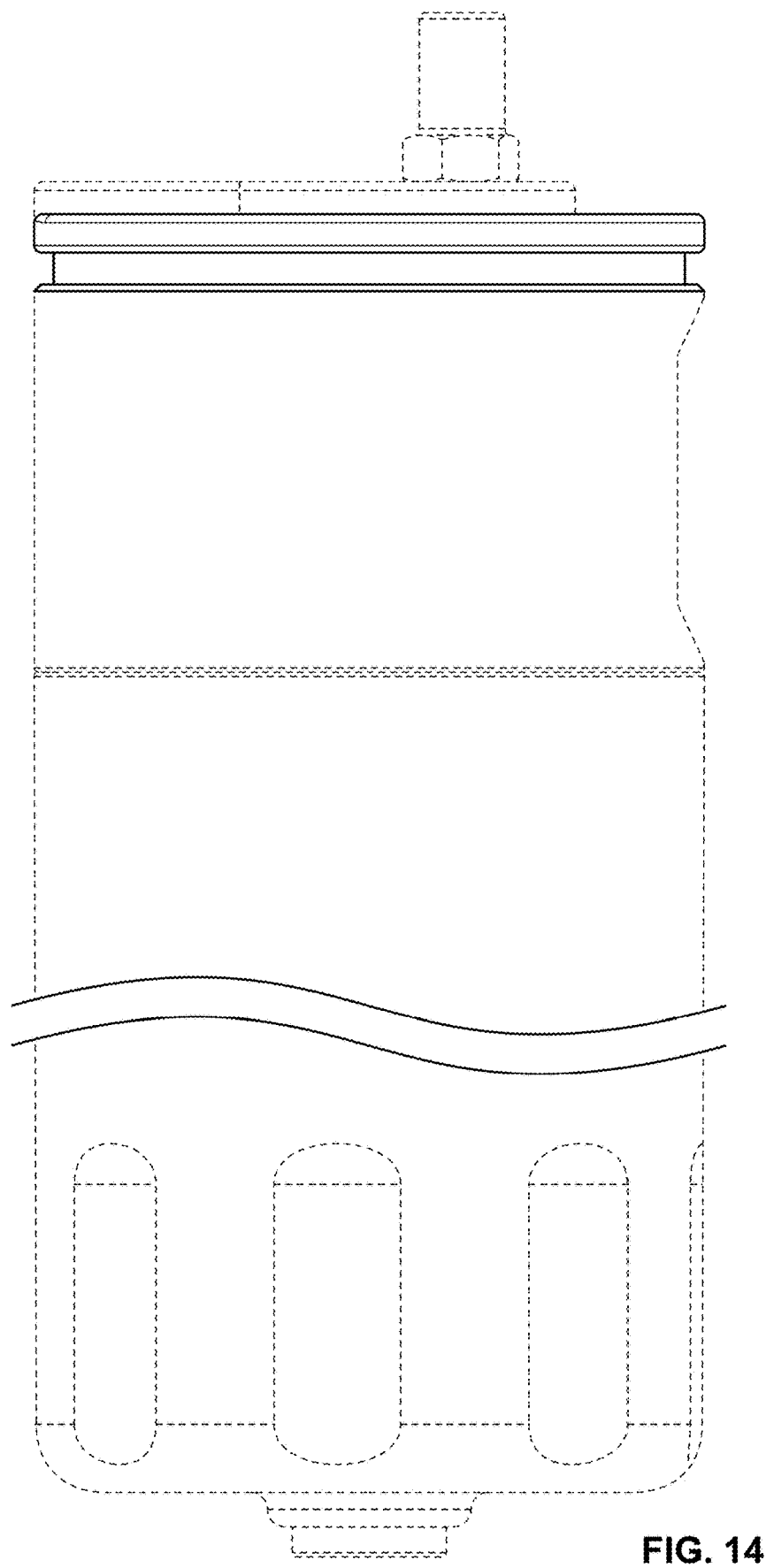
FIG. 14 is a second side view of the exterior of the exemplary waste receptacle of FIG. 8.
Figure 15:
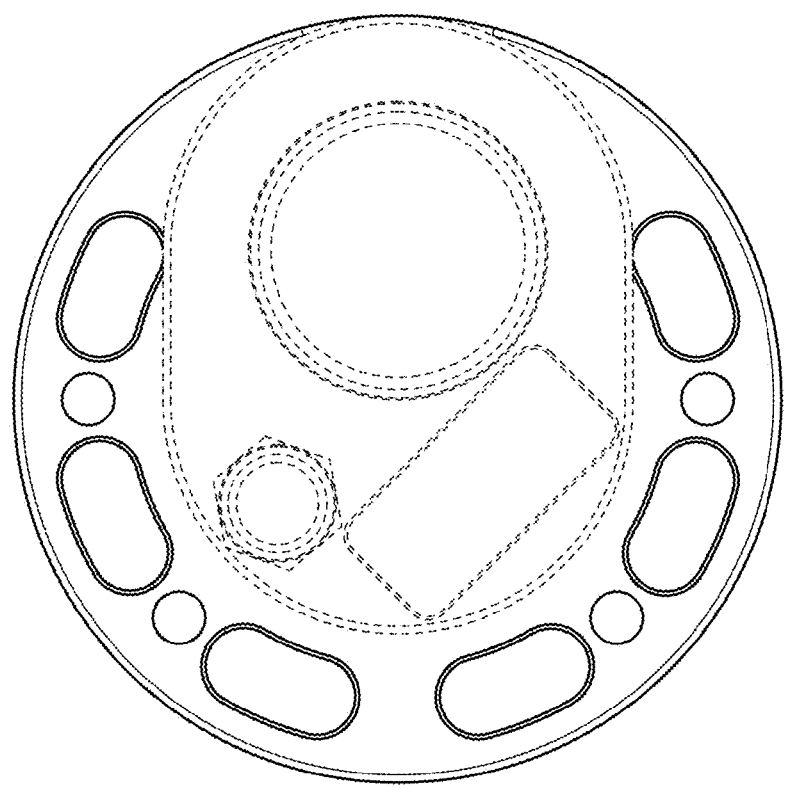
FIG. 15 is a top view of the exterior of the exemplary waste receptacle of FIG. 8.
Figure 16:
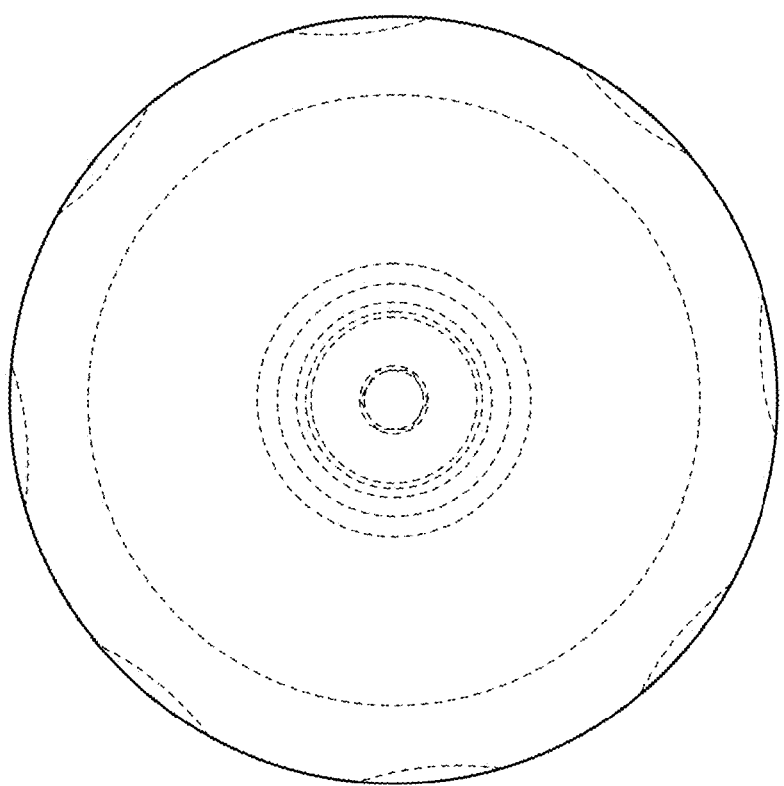
FIG. 16 is a bottom view of the exterior of the exemplary waste receptacle of FIG. 8.

FIGS. 7 and 8 show isometric views of the exterior of an exemplary waste receptacle 200. FIGS. 9-16 are a series of views showing the exterior of an exemplary waste receptacle of indeterminate height with at least some of the ornamental features of the waste receptacle shown in solid lines, and the remainder thereof shown in dashed lines.

Exemplary waste receptacles may be better understood with reference to the drawings, but these waste receptacles are not intended to be of a limiting nature. The same reference numbers are used throughout the drawings and this description refers to the same or like parts. Unless specified otherwise, the shown shapes and relative dimensions are preferred, but are not meant to be limiting unless specifically claimed, in which case they may limit the scope of that particular claim.

Before describing the waste receptacles and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide basic parameters for interpreting terms and phrases used herein.

The phrases "combustion process waste receptacles" and "waste receptacles" describe devices that receive contaminated air (shown as a combination of white/empty circles and black/filled circles) and at least partially clean and/or filter the contaminated air such that the output is filtered air (shown as a combination of white/empty circles and black/filled circles, with fewer black/filled circles than is present in the contaminated air). Exemplary waste receptacles include, but are not limited to, catch cans, oil collectors, and air/oil separators.

The phrases "contaminated air" and "blow-by gases" are described in the Background. Contaminated air may include "fluid contaminants" which are undesirable fluid byproducts of the combustion process including, but not limited to, unburned fuel, water moisture, acids, and oil. Fluid contaminants may include some small solid contaminants. Contaminated air is represented in FIGS. 1-3 as a combination of white/empty circles (representing air) and black/filled circles (representing fluid contaminants). Blow-by gases are a type of contaminated air.

The term "blow-by" is described in the Background. The positive crankcase ventilation (PCV) is described as being an at least partial solution to the pressure caused by and/or the result of blow-by. Blow-by is just one example, however, of a way in which pressure may be introduced into the crankcase. In addition to blow-by, pressure and/or fluid contaminants may be introduced into the crankcase by, for example, valve stem seals not being properly sealed (e.g. the seals are worn), and head gasket not maintaining a proper seal. Although discussed herein using the term blow-by, alternative methods of the introduction of pressure and/or fluid contaminants are meant to be included unless specifically excluded or logically impossible.

The term "conduit" is used to describe any device used to conduct from one location to another. Exemplary conduits include, but are not limited to, hoses, pipes, ducts, tubes, and any known or yet to be discovered means for conducting from one location to another. Exemplary conduits may also include fittings, connectors, seals, hose ends, and/or other structure necessary for the conduit to fulfill its purpose. The systems described herein include three relevant conduits: the fresh air conduit 100 (also referred to as a crankcase vent line), the contaminated air conduit 120 (also referred to as a PCV hose), and the filtered air conduit 130.

The term "vehicle" is meant to refer to any vehicle having an internal combustion engine having an engine crankcase. In addition to automobiles (e.g. cars and trucks), vehicles might be boats, motorcycles, and gas-powered recreational vehicles.

The term "associated" is defined to mean integral or original, retrofitted, attached, connected (including functionally connected), positioned near, and/or accessible by. For example, the filter 220 being "associated with the main passageway 210" may mean that it can be positioned near (just above) the main passageway 210. Another example is that the fluid lock 240 is "associated with the fluid contaminant passageway 230" in that the fluid lock 240 may be functionally connected to the fluid contaminant passageway 230, but may be positioned in alternative positions (e.g. above, within, or below) in relation thereto. (As shown in FIGS. 4 and 5, the fluid lock 240 could be considered to be within the fluid contaminant passageway 230 if the float chamber 230' is considered to be part of the fluid contaminant passageway 230. Alternatively, the fluid lock 240 could be considered to be below the fluid contaminant passageway 230 if the float chamber 230' is not considered to be part of the fluid contaminant passageway 230. In addition, if the float chamber 230' is considered to be within the contaminant reservoir 350, the fluid lock 240 would also be considered to be below the fluid contaminant passageway 230)

It should be noted that relative terms (e.g. first and second) are meant to help in the understanding of the technology and are not meant to limit the scope of the invention. Similarly, unless specifically stated otherwise, the terms "first," "second," and "third" are meant solely for purposes of designation and not for order or limitation.

It should be noted that some terms used in this specification are meant to be relative. For example, the term "top" is meant to be relative to the term "bottom." The term "front" is meant to be relative to the term "back," and the term "side" is meant to describe a "face" or "view" that connects the "front" and the "back." Rotation of the system or component that would change the designation might change the terminology, but not the concept.

Terms such as "may," "might," "can," and "could" are used to indicate alternatives and optional features and only should be construed as a limitation if specifically included in the claims. It should be noted that the various components, features, or embodiments thereof are all "preferred" whether or not it is specifically indicated. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type.

It should be noted that, unless otherwise specified, the term "or" is used in its nonexclusive form (e.g. "A or B" includes, but is not limited to, A, B, A and B, or any combination thereof). It should be noted that, unless otherwise specified, "and/or" is used similarly (e.g. "A and/or B" includes, but is not limited to, A, B, A and B, or any combination thereof). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

The Waste Receptacle in Use:

FIGS. 2 and 3 show an exemplary waste receptacle 200 having a fluid lock 240 that has been inserted inline between the engine crankcase 110 and the air induction system 140 such that the exemplary waste receptacle 200 divides the conduit into a contaminated air conduit 120 and a filtered air conduit 130. (FIGS. 4 and 5 show details of the waste receptacle 200 in the open state (FIG. 4) and the closed state (FIG. 5).) These figures show a fresh air conduit 100, an engine crankcase 110 (that has a PCV valve 112), a contaminated air conduit 120, a waste receptacle 200, a filtered air conduit 130, and an air induction system 140.

In use, fresh air (shown as white/empty circles) from the fresh air conduit 100 enters the engine crankcase 110. Contaminated air (shown as a combination of white/empty circles and black/filled circles) exits the engine crankcase 110 via the PCV valve 112. The contaminated air is then routed via the contaminated air conduit 120 into the inlet port 212 of the main passageway 210 of the waste receptacle 200. A filter 220 positioned within the main passageway 210 is used to at least partially clean the contaminated air to produce filtered air. The filter 220 may be any mechanism for at least partially separating fluid contaminants (shown as black/filled circles) from air (shown as white/empty circles). The filter 220 may include filter material (e.g. stainless steel mesh, sintered metal, or the like) on which the fluid contaminants collect until being pulled down by gravity. The filter 220 may also take advantage of a change in flow direction and simultaneous reduction in flow velocity that causes the fluid contaminants to separate from the airflow.

If the fluid lock 240 is in its open state (FIGS. 2 and 4), the fluid lock 240 does not block (allows passage through) the fluid contaminant passageway 230 such that the majority of fluid contaminants (those filtered by the filter 220) pass through the fluid contaminant passageway 230 (flowing by or through the associated fluid lock 240) and into the fluid contaminant reservoir 250, and the filtered air (shown in FIG. 2 as a combination of white/empty circles and black/filled circles, with fewer black/filled circles than is present in the contaminated air) is then routed through the outlet port 214 of the main passageway 210, through the filtered air conduit 130, and into the air induction system 140. If the fluid lock 240 is in its closed state (FIGS. 3 and 5), the fluid lock 240 blocks (prevents passage through) the fluid contaminant passageway 230 such that the fluid lock 240 prevents passage (of, for example, the fluid contaminants) into the fluid contaminant reservoir 250, the fluid contaminants and the filtered air are routed together (shown in FIG. 3 as a combination of white/empty circles and black/filled circles of at least roughly the same composition as the contaminated air) through the outlet port 214 of the main passageway 210, through the filtered air conduit 130, and into the air induction system 140.

The Waste Receptacle:

FIGS. 4 and 5 show details of an exemplary waste receptacle 200. The waste receptacle 200 has an upper housing 202 and a lower housing 204. Preferably, the lower housing 204 is removably connected to the upper housing 202. Alternatively, the lower housing 204 is integral with upper housing 202. The connection between the housings 202, 204 may be accomplished, for example, using threadings. In the shown waste receptacle 200, the upper housing 202 has male threading around the outside of its lower, annular, peripheral wall, and the lower housing 204 has female threading around the inside of its upper, annular, peripheral wall. The male threading of the upper housing 202 is designed to mate with the female threading of the lower housing 204 such that the housings, 202, 204 may be screwed together. Preferably, the coupling between the upper housing 202 and lower housing 204 is at least substantially air and/or water tight. Alternative removable connections include, but are not limited to, quick release cam lock couplings, ¼-turn connections, friction fits, or any means for removably connecting housings.

The shown upper housing 202 has a main passageway 210 therethrough that includes an inlet port 212 at one end and an outlet port 214 at the other end. Contaminated air enters the waste receptacles 200 through the inlet port 212 and at least partially clean air (if the fluid lock 240 is in the open state) and/or contaminated air (if the fluid lock 240 is in the closed state) exits from the outlet port 214. The inlet port 212 is designed to connect directly or indirectly to the contaminated air conduit 120. The outlet port 214 is designed to connect directly or indirectly to the filtered air conduit 130. The main passageway 210 is shown as bent (not straight) in that the inlet port 212 is associated with the top surface of the waste receptacle 200 and the outlet port 214 is associated with the peripheral wall of the upper housing 202 of the waste receptacle 200. Although the main passageway 210 does not have to bend, the bend creates a change in flow direction that can help reduce the flow velocity and cause the fluid contaminants to separate from the airflow.

Associated with (shown as within) the main passageway 210 (shown as between the inlet port 212 and the outlet port 214) is a filter 220. The fluid lock 240 (discussed below) is shown as being positioned below the filter 220 so that fluid contaminants collected by the filter 220 can drain (using gravity) into the reservoir 250 (shown as the interior of the lower housing 204) via a fluid contaminant passageway 230. The fluid contaminant passageway 230 is branched off the main passageway 210 and provides a fluid connection between the filter 220 and the fluid contaminant reservoir 250. The associated fluid lock 240 may be positioned, for example, below or within the fluid contaminant passageway 230. The fluid contaminant passageway 230 and the fluid lock 240 may be associated with the upper housing 202.

The shown lower housing 204 has an interior reservoir 250 into which fluid contaminants flow when the fluid lock 240 (discussed below) is in its open state. A drain port 252 is shown as being positioned at the bottom of the reservoir 250. FIGS. 2 and 3 show a drain plug that is preferably removably associated with the drain port 252.

The shown waste receptacle 200 may include a dipstick 254 that extends from the top of the upper housing 202 and into the reservoir 250 of the lower housing 204. The top of the dipstick 254 may be used as a handle to allow the user to remove the dipstick 254 from the waste receptacle 200. Because the lower portion of the dipstick 254 is within the reservoir 250, when the dipstick 254 is removed, the level of the fluid contaminants can be determined by the amount of fluid contaminants on the dipstick 254. (The dipstick 254 may have to be removed, wiped clean, reinserted, and then removed again to get an accurate measurement.)

It should be noted that the shown waste receptacle 200 is meant to be exemplary and not to limit the scope of the invention.

The Fluid Lock:

As shown, the fluid lock 240 is positioned below or within the fluid contaminant passageway 230 (which is shown as having an associated float chamber 230'). (In the shown example, if the float chamber 230' is considered to be part of the fluid contaminant passageway 230, then the fluid lock 240 is positioned within the fluid contaminant passageway 230. Alternatively, in the shown example, if the float chamber 230' is not considered to be part of the fluid contaminant passageway 230, then the fluid lock 240 is positioned below the fluid contaminant passageway 230.) A fluid lock 240 preferably has at least two states: an open state as shown in FIGS. 2 and 4, and a closed state as shown in FIGS. 3 and 5. Preferably, the fluid lock 240 transitions from the open state to the closed state when the waste receptacle 200 is "full" (i.e. when the fluid contaminant reservoir 250 reaches a predetermined amount or level that may be less than "completely full").

If the fluid lock 240 is in the open state, at least the majority of fluid contaminants pass through fluid contaminant passageway 230 (that is branched off the main passageway 210 and provides a fluid connection between the filter 220 and the fluid contaminant reservoir 250) and the fluid lock 240 and into the fluid contaminant reservoir 250, and the filtered air is then routed through the outlet port 214 of the main passageway 210. Because the fluid lock 240 in the open state does not block (allows passage) the fluid contaminant passageway 230, the fluid contaminants filtered by the filter 220 can pass through fluid contaminant passageway 230 and the fluid lock 240.

If the fluid lock 240 is in the closed state, the fluid contaminants and the filtered air are routed together through the outlet port 214 of the main passageway 210. Because the fluid lock 240 in the closed state blocks (prevents passage) the fluid contaminant passageway 230, the fluid contaminants filtered by the filter 220 are prevented from passing through fluid contaminant passageway 230 and the fluid lock 240.

The shown exemplary fluid lock 240 includes a float 232 (shown as a ball, sphere, or ball float) having an outer sealing surface 234 (also referred to as the float sealing surface 234). (The float 232 is floatable in that it is preferably made of material that floats on anticipated fluid contaminants and/or may be hollow.) The float 232 is shown as being at least partially positioned within the float chamber 230' of the fluid contaminant passageway 230. As shown, the float chamber 230' in which the float 232 is positioned (and, therefore, is sized to contain) has an entrance and an exit. The entrance is shown as a narrowed section above the float 232 and the exit is shown as having an associated flow-through retainer 242 designed to retain the float 232 within the float chamber 230'. Associated with the entrance of the float chamber 230' is a narrowed sealing surface 238 (also referred to as the chamber sealing surface 238, shown at the top of the float chamber 230', but alternative locations are possible). The narrowed sealing surface 238 is dimensioned to be smaller (shorter) than the diameter (length of the diameter) of the float 232. When the outer sealing surface 234 is spaced from (remote from, distal from, or having a gap defined between) the narrowed sealing surface 238, the fluid lock 240 is open (in the open state shown in FIGS. 2 and 4) and, therefore, fluid contaminants are able to pass through the fluid lock 240. When the outer sealing surface 234 is adjacent to (in sealing contact with) the narrowed sealing surface 238, the fluid lock 240 is closed (in the closed state shown in FIGS. 3 and 5) and, therefore, fluid contaminants cannot pass through the fluid lock 240.

As mentioned, a flow-through retainer 242 (e.g. a screen or a grate) associated with the exit of the float chamber 230' may be used to retain the float 232 at least partially within the float chamber 230' by permeably (allowing fluid to pass through) blocking the exit of the float chamber 230'. Most fluid contaminants pass through the flow-through retainer 242 as they enter the fluid contaminant reservoir 250. The last fluid contaminants entering the float chamber 230' at least mostly stay above the flow-through retainer 242 such that the float 232 is lifted (the float 232 floating upon the fluid contaminants) within the float chamber 230'. The shown flow-through retainer 242 is secured to the upper housing 202 using a retainer securer 244 (shown as a screw). As shown, at least one additional float guide 246 (which may be at least one finger-like projection or spacer that does not completely surround the float 232 so that fluid contaminants may pass by) may be used to guide the float 232 so that the outer sealing surface 234 seals with the narrowed sealing surface 238.

FIGS. 2 and 4 show the fluid lock 240 is in the open state such that it does not block (allows passage) the fluid contaminant passageway 230. The float 232 is shown as positioned near the bottom of the float chamber 230' resting on the flow-through retainer 242 and spaced from at least some of the interior surfaces of the float chamber 230'. As shown, the outer sealing surface 234 of the float 232 is distal from the narrowed sealing surface 238 of the float chamber 230'. In this position, the fluid lock 240 is in the open state (providing a gap or path that allows passage therethrough) and fluid contaminants can pass through the fluid contaminant passageway 230 and the fluid lock 240 and into the fluid contaminant reservoir 250.

FIGS. 3 and 5 show the fluid lock 240 in the closed state such that it blocks (prevents passage) the fluid contaminant passageway 230. As the fluid contaminants fill the fluid contaminant reservoir 250 (shown filling in FIG. 2 and filled in FIG. 3), the float 232 begins to float on the fluid contaminants (FIG. 3). This lifts the float 232 so that it is positioned at least near the top of the float chamber 230'. (As shown in FIG. 3, the level of the fluid contaminants would be above the flow-through retainer 242.) When the level of the fluid contaminants in the fluid contaminant reservoir 250 is high enough (when the fluid contaminant reservoir 250 is "full" which, as mentioned, may be a predetermined amount or level that may be less than "completely full"), the float 232 rises (floating on the fluid contaminants) high enough so that the outer sealing surface 234 of the float 232 mates with the narrowed sealing surface 238 of the float chamber 230'. In this position, the fluid lock 240 is in the closed state (closing the gap or path) and fluid contaminants can no longer pass through the fluid contaminant passageway 230 and the fluid lock 240. Instead, the fluid contaminants and the filtered air are routed together through the outlet port 214 of the main passageway 210.

It should be noted that the shown waste fluid lock 240 is meant to be exemplary and not to limit the scope of the invention unless a particular claim specifically references particular features of the fluid lock 240.

Because a fluid lock 240 physically blocks the fluid contaminant passageway 230 when it is in the closed state, using a fluid lock 240 in a waste receptacle 200 prevents problems such as fluid contaminants sloshing out (e.g. if the waste receptacle is not vertical or if there is a sudden stop), splashing out (e.g. if something drops into the waste receptacle or if there is a sudden stop), overflowing (e.g. if the waste receptacle is full) from, or otherwise escaping during use. Even when the exemplary fluid lock 240 is in the open state, it partially physically blocks the fluid contaminant passageway 230, and, therefore, partially prevents these problems. In addition, the presence of the fluid lock 240 in a waste receptacle 200 prevents overfilling of the fluid contaminant reservoir 250 so that the fluid contaminants do not spill during servicing.

Alternative Waste Receptacles and Fluid Locks:

It should be noted that alternative waste receptacles and fluid locks are contemplated in the scope of the invention.

FIG. 6 shows an alternative waste receptacle 300 with an alternative fluid lock 340. As shown, the waste receptacle 300 has an upper housing 302 and a lower housing 304. The shown upper housing 302 has a main passageway 310 having an inlet port 312 and an outlet port 314. Associated with the main passageway 310 is a filter 320 (shown as within the main passageway 310 and between the inlet port 312 and the outlet port 314). Below the filter 320 is a fluid contaminant passageway 330 that is shown as having an associated fluid lock 340. If the fluid lock 340 is in the open state, at least the majority of fluid contaminants pass through fluid contaminant passageway 330 and the fluid lock 340 and into the fluid contaminant reservoir 350, and the filtered air is then routed through the outlet port 314 of the main passageway 310. If the fluid lock 340 is in the closed state, the fluid contaminants and the filtered air are routed together through the outlet port 314 of the main passageway 310.

The fluid lock 340 of FIG. 6 is shown as a "box" as it is meant to include various types of one-way valves. For example, the fluid lock 340 could be, for example, a flap that is hinged at one point and floats from a lowered position to a sealed position. The fluid lock 340 could continue to use a float ball, but it could be retained in a different manner (e.g. floating up and down on a wire or dowel). The fluid lock could be more sophisticated in that it has electronics such as a sensor to determine when the fluid contaminant reservoir 350 is full and structure to open/close the fluid lock (e.g. electronics that receive a signal from the sensor and mechanical mechanisms that open/close the fluid lock).

The configuration of the shown exemplary fluid lock 240 with a float guide 246 also may be modified. For example, depending on the configuration (including size, shape, and location) of the float 232 and/or the float chamber 230', the finger-like projection(s) or spacer(s) may not be necessary. Another example is, as mentioned, the flow-through retainer 242 may not be required.

Other structures or features that might be included in a waste receptacle 200, 300 include sensors, transmitters, and/or indicators. Sensors may be used to detect when the fluid contaminant reservoir 250, 350 is full. Transmitters may be used to relay a signal from the sensors to mechanical mechanisms (with receivers and appropriate controllers) that open/close the fluid lock. The transmitters may also be used to transmit the fullness of the fluid contaminant reservoir 250, 350 to indicator(s) (e.g. a light and/or a buzzer) having associated receivers and/or controllers, the indicator(s) positioned to make the driver aware that the waste receptacle 200, 300 is full. For example, the indicator(s) may be positioned within the interior of a vehicle.

It should be noted that some of the prior art alternative waste receptacles could be modified to include a fluid lock. Exemplary alternative waste receptacles that could be so modified include, but are not limited to those described in the following patents and publications:

U.S. Pat. No. 6,729,316 to Knowles, entitled "Method and Apparatus for Treating Crankcase Emission";

U.S. Pat. No. 8,152,887 to Patel, entitled "Air/Oil Separator";

U.S. Pat. No. 8,968,446 to Mainiero, entitled "Oil and Air Separation System and Method";

U.S. Patent Publication No. 2019/0210039 to Kuhn, entitled "Crankcase Ventilation Management Devices, Systems, and Methods"; and U.S. Patent Publication No. 2021/0095586 to Phillips et al., entitled "Porous Polymer Matrix Catch Can."

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

All references (including, but not limited to, publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A combustion process waste receptacle having a main passageway, a fluid contaminant passageway, a filter, and a fluid contaminant reservoir, said main passageway having an inlet port and an outlet port, said filter associated with said main passageway, said fluid contaminant passageway providing fluid connection between said filter and said fluid contaminant reservoir, said waste receptacle comprising:
   a. a fluid lock associated with said fluid contaminant passageway and positioned directly below said filter, said fluid lock having an open state and a closed state, said fluid lock comprising:
      i. a float chamber;
      ii. a floatable float at least partially positioned within said float chamber and held therein by a flow-through retainer; and
      iii. said fluid lock is in said open state when said floatable float rests on said flow-through retainer;
   b. in said open state, said fluid lock allows passage through said fluid contaminant passageway; and
   C. in said closed state, said fluid lock prevents passage through said fluid contaminant passageway;
   d. wherein when said waste receptacle receives contaminated air at said inlet port, if said fluid lock is in said open state, fluid contaminants pass through said fluid lock and into said fluid contaminant reservoir, and if said fluid lock is in said closed state, fluid contaminants are prevented from passing through said fluid lock and into said fluid contaminant reservoir.

2. The waste receptacle of claim 1, wherein said fluid lock transitions from said open state to said closed state when said fluid contaminant reservoir is full.

3. The waste receptacle of claim 1, said filter positioned within said main passageway between said inlet port and said outlet port.

4. The waste receptacle of claim 1, said fluid contaminant passageway positioned below said filter.

5. The waste receptacle of claim 1, said filter positioned within said main passageway between said inlet port and said outlet port, and said fluid lock positioned within said fluid contaminant passageway.

6. The waste receptacle of claim 1, said fluid contaminant passageway being branched off said main passageway.

7. The waste receptacle of claim 1, said fluid lock being a one-way valve.

8. The waste receptacle of claim 1, said fluid lock comprising:
   a. said float chamber with a chamber sealing surface, said float chamber associated with said fluid contaminant passageway;
   b. said floatable float with a float sealing surface;
   c. said fluid lock is in said open state when a gap is defined between said float sealing surface and said chamber sealing surface; and
   d. said fluid lock is in said closed state when said float sealing surface is in sealing contact with said chamber sealing surface.

9. The waste receptacle of claim 1, said fluid lock comprising:
   a. said float chamber with a chamber sealing surface, said float chamber associated with said fluid contaminant passageway;
   b. said floatable float with a float sealing surface;
   c. said fluid lock is in said open state when a gap is defined between said float sealing surface and said chamber sealing surface; and
   d. said fluid lock is in said closed state when said floatable float rises to bring said float sealing surface in sealing contact with said chamber sealing surface.

10. A combustion process waste receptacle having a main passageway, a fluid contaminant passageway, a filter, and a fluid contaminant reservoir, said main passageway having an inlet port and an outlet port, said filter associated with said main passageway, said fluid contaminant passageway providing fluid connection between said filter and said fluid contaminant reservoir, said waste receptacle comprising:
   a. a fluid lock associated with said fluid contaminant passageway and positioned directly below said filter, said fluid lock having an open state and a closed state, said fluid lock comprising:

i. a float chamber;
      ii. a floatable float at least partially positioned within said float chamber and held therein by a flow-through retainer; and
      iii. said fluid lock is in said open state when said floatable float rests on said flow-through retainer;
   b. in said open state, said fluid lock allows passage through said fluid contaminant passageway; and
   C. in said closed state, said fluid lock prevents passage through said fluid contaminant passageway;
   d. wherein when said waste receptacle receives contaminated air at said inlet port, if said fluid lock is in said open state, fluid contaminants pass through said fluid lock and into said fluid contaminant reservoir, and if said fluid lock is in said closed state, fluid contaminants are prevented from passing through said fluid lock and into said fluid contaminant reservoir; and
   e. wherein said fluid lock transitions from said open state to said closed state when said fluid contaminant reservoir is full.

11. The waste receptacle of claim 10, said filter positioned within said main passageway between said inlet port and said outlet port.

12. The waste receptacle of claim 10, said fluid contaminant passageway positioned below said filter.

13. The waste receptacle of claim 10, said filter positioned within said main passageway between said inlet port and said outlet port, and said fluid lock positioned within said fluid contaminant passageway.

14. The waste receptacle of claim 10, said fluid contaminant passageway being branched off said main passageway.

15. The waste receptacle of claim 10, said fluid lock being a one-way valve.

16. The waste receptacle of claim 10, said fluid lock comprising:
   a. said float chamber with a chamber sealing surface, said float chamber associated with said fluid contaminant passageway;
   b. said floatable float with a float sealing surface;
   c. said fluid lock is in said open state when a gap is defined between said float sealing surface and said chamber sealing surface; and
   d. said fluid lock is in said closed state when said float sealing surface is in sealing contact with said chamber sealing surface.

17. The waste receptacle of claim 10, said fluid lock comprising:
   a. said float chamber with a chamber sealing surface, said float chamber associated with said fluid contaminant passageway;
   b. said floatable float with a float sealing surface;
   c. said fluid lock is in said open state when a gap is defined between said float sealing surface and said chamber sealing surface; and
   d. said fluid lock is in said closed state when said floatable float rises to bring said float sealing surface is in sealing contact with said chamber sealing surface.

18. A combustion process waste receptacle having a main passageway, a fluid contaminant passageway, a filter, and a fluid contaminant reservoir, said main passageway having an inlet port and an outlet port, said filter associated with said main passageway, said fluid contaminant passageway providing fluid connection between said filter and said fluid contaminant reservoir, said waste receptacle comprising:
   a. a fluid lock associated with said fluid contaminant passageway and positioned directly below said filter, said fluid lock having an open state and a closed state, said fluid lock comprising:
      i. a float chamber having a chamber sealing surface, said float chamber associated with said fluid contaminant passageway;
      ii. a floatable float having a float sealing surface, said floatable float at least partially positioned within said float chamber; and
      iii. a flow-through retainer, said floatable float retained within said float chamber by said flow-through retainer;
   b. said fluid lock is in said open state when said floatable float rests on said flow-through retainer and a gap is defined between said float sealing surface and said chamber sealing surface, said fluid lock in said open state allowing passage through said fluid contaminant passageway; and
   c. said fluid lock is in said closed state when said floatable float rises to bring said float sealing surface is in sealing contact with said chamber sealing surface, said fluid lock in said closed state preventing passage through said fluid contaminant passageway;
   d. wherein when said waste receptacle receives contaminated air at said inlet port, if said fluid lock is in said open state, fluid contaminants pass through said fluid lock and into said fluid contaminant reservoir, and if said fluid lock is in said closed state, fluid contaminants are prevented from passing through said fluid lock and into said fluid contaminant reservoir.

19. The waste receptacle of claim 1, said fluid contaminant passageway positioned directly below said filter.

20. The waste receptacle of claim 1, wherein gravity causes fluid contaminants collected by said filter to drain into said fluid contaminant reservoir.

21. The waste receptacle of claim 1, said flow-through retainer defining a plurality of openings.

22. The waste receptacle of claim 10, said fluid contaminant passageway positioned directly below said filter.

23. The waste receptacle of claim 10, said fluid lock positioned directly below said filter.

24. The waste receptacle of claim 10, wherein gravity causes fluid contaminants collected by said filter to drain into said fluid contaminant 2 reservoir.

25. The waste receptacle claim 10, said flow-through retainer defining a plurality of openings.

26. The waste receptacle of claim 18, said fluid contaminant passageway positioned directly below said filter.

27. The waste receptacle of claim 18, wherein gravity causes fluid contaminants collected by said filter to drain into said fluid contaminant reservoir.

28. The waste receptacle of claim 18, said flow-through retainer defining a plurality of openings.

\* \* \* \* \*